US012683394B2

(12) United States Patent
Kenyon et al.

(10) Patent No.: US 12,683,394 B2
(45) Date of Patent: Jul. 14, 2026

(54) NONLINEAR DROOP GRID-FORMING INVERTER CONTROL

(71) Applicant: The Regents of the University of Colorado, a body corporate, Denver, CO (US)

(72) Inventors: Richard Wallace Kenyon, Boulder, CO (US); Amirhossein Sajadi, Madison, WI (US); Bri-Mathias S. Hodge, Golden, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 514 days.

(21) Appl. No.: 18/330,251

(22) Filed: Jun. 6, 2023

(65) Prior Publication Data

US 2023/0402847 A1 Dec. 14, 2023

Related U.S. Application Data

(60) Provisional application No. 63/350,935, filed on Jun. 10, 2022.

(51) Int. Cl.
    *H02J 3/0014* (2026.01)
(52) U.S. Cl.
    CPC ................................. *H02J 3/0014* (2026.01)

(58) Field of Classification Search
CPC ........ H02M 5/005; H02M 5/02; H02M 5/272; H02M 5/297; H02M 5/32; H02J 3/24; H02J 3/381
See application file for complete search history.

(56) References Cited

U.S. PATENT DOCUMENTS

| | | | |
|---|---|---|---|
| 10,770,988 B2 * | 9/2020 | Chen ...................... | H02M 7/493 |
| 2007/0274114 A1 * | 11/2007 | Neacsu ................. | H02M 7/493 |
| | | | 363/132 |
| 2010/0284117 A1 * | 11/2010 | Crane .................... | H02H 7/268 |
| | | | 361/93.1 |
| 2014/0316592 A1 * | 10/2014 | Haj-Maharsi ......... | F03D 7/0284 |
| | | | 290/44 |
| 2019/0067988 A1 * | 2/2019 | Ghosh ..................... | H02J 9/062 |
| 2019/0267806 A1 * | 8/2019 | Scott ......................... | H02J 3/46 |
| 2020/0021103 A1 * | 1/2020 | Frampton ............... | H02M 7/72 |
| 2020/0313565 A1 * | 10/2020 | Mohamed Sayed Ahmed ........... | |
| | | | H02M 7/125 |
| 2020/0403413 A1 * | 12/2020 | Premm ................... | H02J 3/381 |
| 2022/0077688 A1 * | 3/2022 | Patarroyo ................ | H02J 3/46 |

* cited by examiner

*Primary Examiner* — Nicholas Klicos
(74) *Attorney, Agent, or Firm* — Workman Nydegger

(57) ABSTRACT

A computer system for grid-forming control detects a change of a first magnitude in power delivered at a point of interconnection with an alternating current electric grid. The computer system then generates a non-linear change in frequency at the point of interconnection with the alternating current electric grid. Generating the non-linear change in frequency causes a grid interfacing device to compensate in a non-linear manner for a power imbalance on the alternating current electric grid.

20 Claims, 8 Drawing Sheets

_100_

_100_

_200_

*300*

*400*

_500_

_600_

Power Sharing Controller

900

1000

*1100*

NONLINEAR DROOP GRID-FORMING INVERTER CONTROL

CROSS-REFERENCE TO RELATED APPLICATIONS

This application claims the benefit of and priority to U.S. Provisional Patent Application Ser. No. 63/350,935 filed on Jun. 10, 2022, and entitled "NONLINEAR DROOP GRID-FORMING INVERTER CONTROL," which application is expressly incorporated herein by reference in its entirety.

BACKGROUND AND RELEVANT ART

As the shares of energy supplied by inverter-based resources (IBRs) continues to grow around the world, dynamic challenges associated with the fundamental differences between IBRs and synchronous generators (SGs) become more exacerbated. In particular, with the hitherto ubiquitous grid-following (GFL) control approach for parallel connected IBRs, very high instantaneous power penetrations become infeasible due to system dynamics and stability related concerns stemming from a paucity of grid-forming (herein understood as devices that establish and generally regulate the local voltage waveform) assets on the power system. Thus, attention in both academia and industry has recently shifted towards grid-forming (GFM) IBRs, which regulate the local frequency and voltage magnitude independently, as opposed to conventional GFL IBRs that regulate real and reactive power injections as a function of the local voltage and frequency. Hitherto now, the relationships exercised for regulating the local frequency as a function of delivered power with parallel connected GFM IBRs have been in the linear regime.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for grid-forming control. The computer system can detect a change of a first magnitude in power delivered at a point of interconnection with an alternating current electric grid. The computer system can then generate a non-linear change in frequency at the point of interconnection with the alternating current electric grid. Generating the non-linear change in frequency can cause a grid interfacing device to compensate in a non-linear manner for a power imbalance on the alternating current electric grid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figures 1, 2:
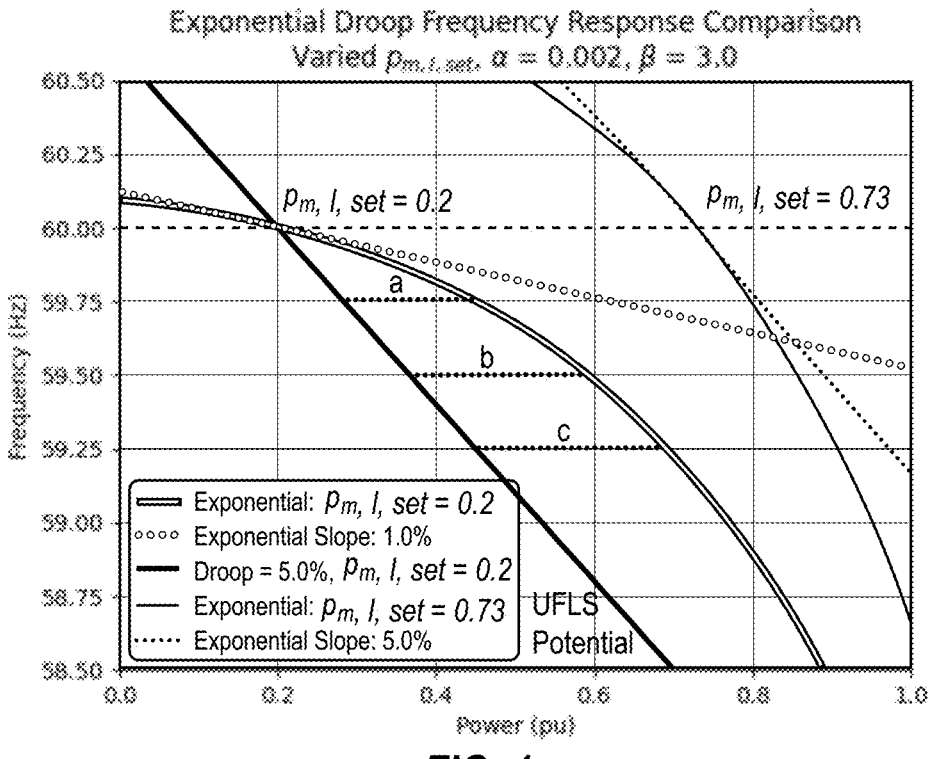
FIG. 1 illustrates Droop-e power-frequency curves for two different inverter active power dispatch values when the steady state frequency is 60 Hz.
FIG. 2 illustrates a simple 3-bus system including a synchronous generator and a Droop-e grid-forming inverter that is used to demonstrate the device level stability via a small signal analysis and time domain simulations.

Disclosed embodiments include a computer system for grid-forming control. The computer system can detect a change of a first magnitude in power delivered at a point of interconnection with an alternating current electric grid. The computer system can then generate a non-linear change in frequency at the point of interconnection with the alternating current electric grid. Generating the non-linear change in frequency can cause a grid interfacing device to allow power transfer to the grid in a non-linear manner for a power imbalance on the alternating current electric grid. As used herein, a "point of interconnection" is the physical interface where different electrical systems or entities connect to exchange power or information within a power grid or renewable energy integration context. This is the point at which the frequency and power transfer of the device is measured.

Disclosed embodiments include a novel Droop-e control will be described, but one of skill in the art will appreciate that this particular system is provided only for example and explanation. Additional embodiments include more general nonlinear control systems in accordance with the description provided herein. Droop gain, also known as droop compensation or droop control, is a technique used in power systems to regulate the sharing of electric load between multiple interconnected generators. It is commonly employed in applications such as parallel operation of generators, load sharing, and frequency control.

In a power system, generators are typically connected in parallel to supply power to a common aggregation of load. Each generator has its own control system to regulate its output and maintain system stability. Droop gain is a control parameter used in these systems to distribute the load changes between generators in a proportional manner. The concept of droop gain is derived from the natural droop characteristics of AC power systems, and the natural behavior of rotating machines to decrease/increase in speed when the load is increased/decreased. With rotating machines under droop control, an increase/decrease in delivered power is generally met with a decrease/increase in the frequency, to counteract the implicated increase/decrease in load on the system. Droop gain is defined as the change in generator output per unit change in frequency. It determines how much the generator output changes in response to a frequency deviation from the setpoint, typically the nominal value (e.g., 60 Hz in the North American interconnections.)

By adjusting the droop gain, the generators can be made to respond to frequency deviations and adjust their outputs accordingly. A higher droop gain means that the generator will respond more aggressively to frequency deviations and provide a larger change in output, while a lower droop gain results in a more gradual response. The purpose of using droop gain is to achieve proportional load sharing among generators. When multiple generators are operating in parallel, each generator's output will vary based on its droop gain setting. As the load on the system increases, the frequency decreases, and generators with higher droop gains will increase their outputs more than those with lower droop gains. This differential response helps distribute the load in proportion to the droop gains, preventing one generator from becoming overloaded while others operate at lower capacities.

As such, Droop gain is a parameter in power system control as it enables stable and reliable operation of interconnected generators. By adjusting the droop gain settings appropriately, system operators can achieve effective and equitable load sharing, frequency regulation, and maintain overall system stability.

The presence of a power generation device that directly regulates frequency on a power system is unprecedented; even a synchronous generator (SGs), the traditional grid-forming asset on power systems, has frequency trajectories first and foremost dictated and constrained by the laws of rotational kinematics (i.e., the swing equation). On the contrary, grid-forming (GFM) inverter-based resources (IBRs) have substantial control freedom and response agility due to the absence of physical motions and are instead primarily constrained by the limits of power availability and device component ratings (e.g., semiconductor switches, filter components, etc.). This fundamental contrast between the GFM IBR and the SG presents a great opportunity for a modern approach to generation device enhanced operability, particularly when these GFM devices are paired with storage or curtailed resources, an unavoidable reality during high IBR operations when positive headroom reserves, a fundamental requirement for general power system operation, must be sourced from IBRs.

In conventional power systems, where power deficits (also referred to as changes in power magnitude) are compensated by SGs through a governor response, a generation-load imbalance requires a commensurate deviation in frequency as a signal for SG governors to adjust power output. The change in magnitude of power supplied to the network by governor action is a function of frequency, as described in (1):

$$p_{m,G} - p_{m,Gset} = D(\omega_0 - \omega) \tag{1}$$

where $p_{m,G}$ is the SG mechanical power, $p_{m,G,set}$ is the exogenous SG mechanical power setpoint, D is the droop gain, which in per unit is 5% in the United States, coo is the radian frequency setpoint ($\omega_0 = 2\pi f \approx 377$, where $f = 60$ Hz in the North American interconnections), and $\omega$ is the local, and system-wide synchronization radian frequency upon reaching steady state. The core governor dynamics of an SG are captured by (2), and a basic no-reheat turbine in (3):

$$T_{SV}\frac{dp_{SV}}{dt} = p_{SV} + p_{m,G,set} - \frac{1}{D}\left(\frac{\omega_G}{\omega_s} - 1\right) \tag{2}$$

$$T_{CH}\frac{dp_{m,G}}{dt} = -p_{m,G} + p_{SV} \tag{3}$$

where $T_{SV}$ the valve time constant, $p_{SV}$ the steam chest power command, D is the droop gain, $\omega_G$ is the SG frequency, $\omega_s$ is the synchronous frequency, $T_{CH}$ is the turbine steam chest time constant, and $p_{m,G}$ is the mechanical power, equal to the device mechanical torque ($t_m$) in per unit. The reciprocal position of D in (2) shows that for values of D approaching 0%, the governor dynamics become increasingly faster without bound.

The frequency dynamics of the device evolve according to the swing equation (4); the damping component is not shown for illustrative purposes:

$$\frac{2H}{\omega_s}\frac{d\omega_G}{dt} = p_{m,G} - p_{e,G} \tag{4}$$

where H is the inertia time constant of the device and $p_{e,G}$ is the electrical power. Transient load perturbations manifest as deviations in $p_{e,G}$, which cause the frequency to evolve according to (4). Only after the frequency changes will the governor/turbine systems modulate $p_{m,G}$; changes in $p_{m,G}$ due to a perturbation are a function of $\omega_G$, and inversely proportional to D. To achieve larger $p_{m,G}$ contributions to a relative network perturbation would require smaller D values, which may result in instability due to the increase in rate of change of $p_{SV}$ (2), caused by the reciprocal relationship with D. Operating at D=0 is mathematically infeasible.

In emerging power systems with more GFM IBRs coming online, the frequency-power dynamic response of power systems may be governed differently. The droop controlled GFM frequency dynamics are shown in (5) and (6):

$$\frac{d\delta_I}{dt} = D(p_{m,I,set} - p_{m,I}) + \omega_{set} \tag{5}$$

$$\frac{d\omega_I}{dt} = D\omega_{fil}(p_{m,I} - p_{meas,I}) \tag{6}$$

where $\delta_I$ is the inverter electric angle, D is the droop gain, $p_{m,I,set}$ is the exogenous power setpoint, $p_{m,I}$ is the filtered power, $\omega_I$, is the inverter frequency, cop is the power measurement cutoff frequency, and $p_{meas,I}$ is the measured, instantaneous power output. This control approach leverages the natural frequency-droop characteristics of inductive networks to distribute power perturbations amongst devices on the network. Conspicuously absent as a control variable in the frequency dynamics of the GFM is $\omega_I$. Additionally, of note is the inverted relationship between frequency and power, as compared to the synchronous generator. Changes in $\omega_I$ and the point of interconnection frequency result in power deviations due to the laws of power flow; in fact, it is appropriate to think that power is extracted from a GFM due to the frequency regulation approach of the device. A change in $\omega_I$ is not required to change the power exported to the network; with respect to frequency regulation, GFM devices are proactive. D is a lever to influence how the local frequency changes, as a function of $p_{m,I}$. Expressed another way, a GFM can deliver larger amounts of power to the network by simply changing the frequency less, which is accomplished with a smaller D. As $D\rightarrow0$, deviations of $p_{m,I}$ yield decreasing changes in frequency, and the rate of change of frequency (ROCOF), expressed in (6), eventually reaches zero. The governing equations indicate that operating at D=0 is feasible.

In at least one embodiment, Droop-e control comprises making D a non-linear function of available headroom, which is accomplished by using $p_{m,I}$ as the independent variable in an exponential (instead of linear) function, as shown in (7):

$$D = d_e(p_{m,I}) = \omega_b a \left[ e^{\beta(p_{m,I,set})} - e^{\beta(p_{m,I})} \right] \tag{7}$$

where $\alpha$ is the proportional scalar, with units of per unit frequency, $\beta$ is the argument scale in per unit power, $\omega_b$, is the base frequency, and $p_{m,I}$ is constrained to the domain 0-1.0, for an assumed battery energy storage system. This function, $D_e(p_{m,I})$, we call Droop-e control. The values of $\alpha$ and $\beta$ have been chosen as 0.002 and 3.0, respectively.

FIG. 1 shows a chart 100 of the Droop-e power-frequency curves for two different inverter dispatch values, $p_{m,I,set}$, when the steady state frequency is 60 Hz. A network perturbation will cause $p_{m,I}$ to change according to the laws of power flow, because the GFM inverter will initially maintain the local frequency, which incurs changes in angle differentials and a resultant change in power extraction from the inverter. Focusing on $p_{m,I,set}$=0.2, the solid line trace shows the Droop-e frequency trajectory, with a static 5% droop trajectory (dash-dot line trace) also shown at the same dispatch for comparison. The dotted line curve represents an extrapolation of the initial droop value at $p_{m,I,set}$=0.2, which is equal to 1%. At $p_{m,I,set}$=0.73, due to the values of $\alpha$ and $\beta$ selected for this work, the initial droop value is equal to 5%. Note the vastly different frequency-power trajectory for the Droop-e control at this dispatch, vs. the dispatch $p_{m,I,set}$=0.2.

FIG. 1 illustrates Droop-e frequency curves, showing the resultant frequency trajectories for two different dispatches, with tangential droop curves at those dispatches for illumination purposes. These Power-Frequency curves show the output for a battery energy storage system, where for power levels between −1.0 to 0 pu (a charging behavior), the curves would be mirrored and inverted. In the case of a device with power output only between 0-1.0 pu, the mirror and inversion would occur at 0.5 pu. A 5% static droop curve is included for comparison at the $p_{set}$=0.2 dispatch. The region below 59.0 Hz is shaded as an indicator of potential nonlinear protection such as underfrequency load-shedding (UFLS); however, it is noted that some UFLS schemes may trigger at higher frequencies.

The advantage of the proposed control scheme is shown with respect to the three rays between the Droop-e and 5% static curves from $p_{set}$=0.2, labelled 110, 120, and 130 in FIG. 1. The power deviations for each control and resultant frequency deviations are presented in Table I. Evidently, the Droop-e control delivers more power to the network for a given frequency deviation at lower dispatches, which is numerically presented by the $\Delta p_{diff}$=(Droop-e)−(Static 5%) values. Thus, Droop-e allows the generator to utilize from 18% to 25% more of its headroom on a capacity basis than a static linear droop value of 5%, at $p_{m,I,set}$=0.2, for a 0.75 Hz deviation from the nominal.

TABLE I

| Comparison of Power Delivered for Droop-e and Static 5% Control at $p_{m, I, set}$ = 0.2(pu). Corresponds with FIG. 1. | | | |
|---|---|---|---|
| Ray | $\Delta$f (Hz) | Droop-e $\Delta p_{m, I}$ (pu) | Static 5% $\Delta p_{m, I}$ (pu) | $\Delta p_{diff}$ (pu) |
| a | 0.25 | 0.26 | 0.08 | 0.18 |
| b | 0.50 | 0.40 | 0.17 | 0.23 |
| c | 0.75 | 0.50 | 0.25 | 0.25 |

At least one benefit of the Droop-e control is to leverage a larger amount of available headroom for a smaller frequency deviation at relatively lower dispatches, precisely when larger amounts of headroom are available. As a result, the frequency dynamics of the system are suppressed due to the GFM inverter delivering more power to the network with a relatively smaller frequency deviation. While this is helpful to mitigate the dynamics of smaller power systems when load perturbations are on par with the rating of the device, it is also beneficial from a greater headroom delivery potential for larger interconnected systems.

Another potential benefit to the Droop-e control is the increase in droop slope at higher dispatches. This is advantageous because a GFM inverter cannot export more power than the rating, and a mitigation strategy must be employed. With Droop-e control, the frequency will be lowered at a greater rate at higher dispatches, which will incur larger power extraction from adjacent, frequency responding devices. One type of GFM limiting in the literature is the CERTS limiter, which employs aggressive PI controllers to rapidly change frequency when violations are met. The benefit of Droop-e control over this method is that the device does not enter a non-droop calculated regime with power violations, but instead maintains a droop-type relation with $p_{m,I}$.

Yet another potential benefit of the Droop-e control comes in the form of reduced ROCOF at lower inverter dispatch levels. The expression of ROCOF in (6) shows a direct proportionality to D. With Droop-e, this is replaced by $D_e(p_{m,I})$, which is strictly less than D for dispatches below $p_{m,I,set}=0.73$. Therefore, at these lower dispatches, the ROCOF is less than for a static 5% droop. This is an important benefit to secure the reliability of power delivery where the grid is equipped with relays that activate on the basis of ROCOF.

A first step in assessing the viability of the Droop-e control is a small signal analysis. The small signal stability analysis approach consists of expressing the entire power system including lines, loads, and generators in the differential-algebraic form of (8) and (9):

$$\frac{dx}{dt} = f(x, y, u) \tag{8}$$

$$0 = g(x, y, u) \tag{9}$$

where x is a vector of dynamical states, y is a vector of algebraic variables, u is the set of exogenous inputs, f is the set of functions describing the time evolution of the dynamical states, x, and g is the set of functions relating the network algebraic variables. (8) and (9) can be linearized in the following form:

$$\Delta \dot{x} = A_{sys}\Delta x + B\Delta u \tag{10}$$

where $A_{sys}$ represents the aggregation of all algebraic equations within the dynamical expressions, and B is the matrix of exogenous control parameters. The eigenvalues $\lambda_i$ of $A_{sys}$ are generally complex in the form of $\lambda_i=\alpha_i+j\omega_i$, where $\alpha_i$ and $\omega_i$ are the real and imaginary parts, respectively, of the ith eigenvalue. Positive values of a, indicate fundamental instabilities, while the damping ($\zeta$) of the eigenvalues is calculated as (11):

$$\zeta_i = -\frac{\alpha_i}{\sqrt{\alpha_i^2 + \omega_i^2}} \tag{11}$$

Consider the simple 3-bus network 200 of FIG. 2. This system is used to demonstrate the device level stability via a small signal stability analysis. An SG is located at bus 210 and a Droop-e GFM IBR (assumed a battery energy storage system with no energy availability constraints) is at bus 220. The impedances $X_a$ and $X_b$ connect the three buses. The network base is 100 MVA, 18 kV, which applies to all per unit values except for the GFM, which is rated at 50 MVA. The GFM was purposefully chosen at a lower rating as compared to the SG, to show the stabilizing benefit of the Droop-e control even at relatively lower ratings. The load at bus 2 is constant power, with a 0.95 leading power factor. The network details are provided in Table II.

Figure 3:
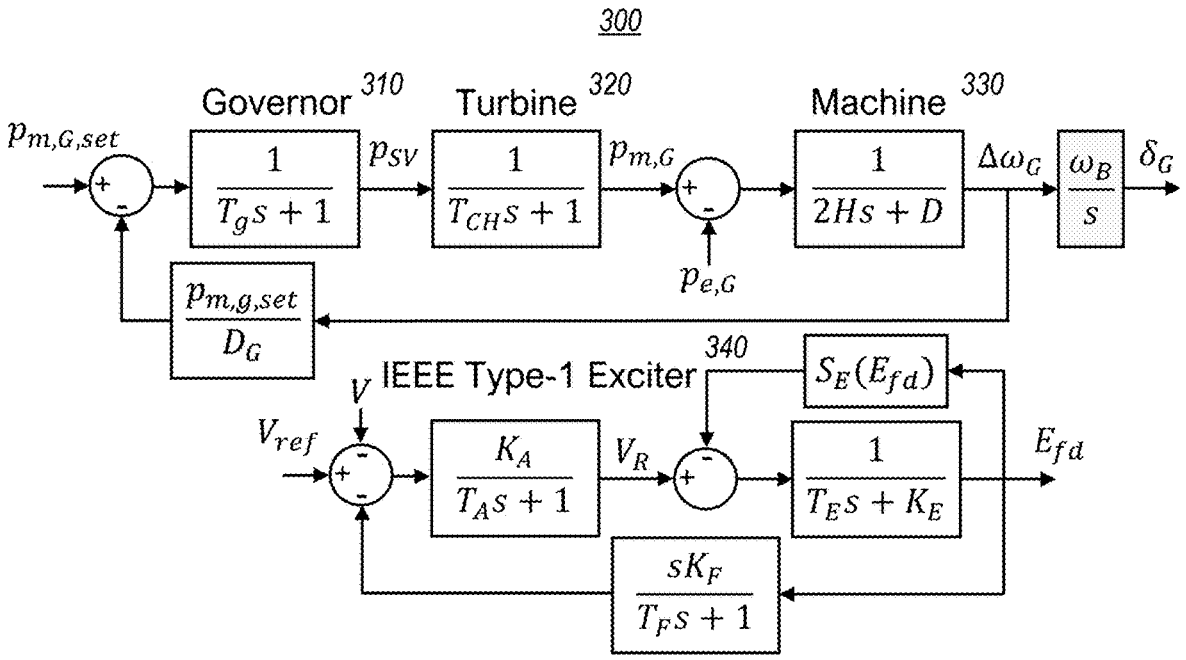
FIG. 3 illustrates the synchronous generator model with governor, turbine, machine, and exciter dynamic sub-systems.

An SG model used in these studies was constructed in accordance with the block diagram 300 of FIG. 3. The governor model 310 is a first order system acting on the difference between $p_{m,G,set}$ and the droop relation to frequency deviations, $\Delta\omega_G$. The turbine model 320 is a simple steam chest with no reheat process. The standard swing equation machine dynamics 330 are included. The exciter 340 is based on the IEEE Type-1 model. The saturation function is an exponential of the form: $S_E(E_{fd})=\gamma e^{\epsilon Efd}$. Flux decay is modelled but not shown in FIG. 3. The result is a 9-th order model, with the states provided in (12). The standard voltage behind reactance model is used to connect the SG to the network. The SG parameters are provided in Table II.

$$x_{SG} = [\delta_G, \omega_G, E'_q, E'_d, E_{fd}, V_R, R_f, p_{m,G}, p_{SV}] \tag{12}$$

Figure 4:
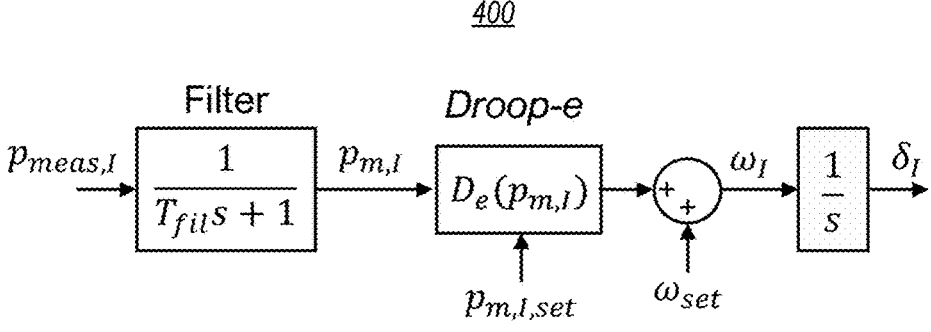
FIG. 4 illustrates a frequency controller with a Droop-e method.

The frequency control 400 for the GFM model is shown in FIG. 4. The instantaneous measured power $p_{meas,I}$ is passed through a first order filter with time constant $T_{fil}$. The resultant $p_{m,I}$ value is provided to the Droop-e block along with $p_{m,I,set}$ to determine the output frequency, $\omega_I$; a factor of $2\pi$ is not explicitly shown.

FIG. 4 illustrates frequency control with the Droop-e method. The instantaneous, measured output power ($p_{meas,I}$) is filtered prior to being passed to the Droop-e controller. Integration of the frequency ($\omega_I$) yields the local angle for the GFM ($\delta_I$).

Figure 5:
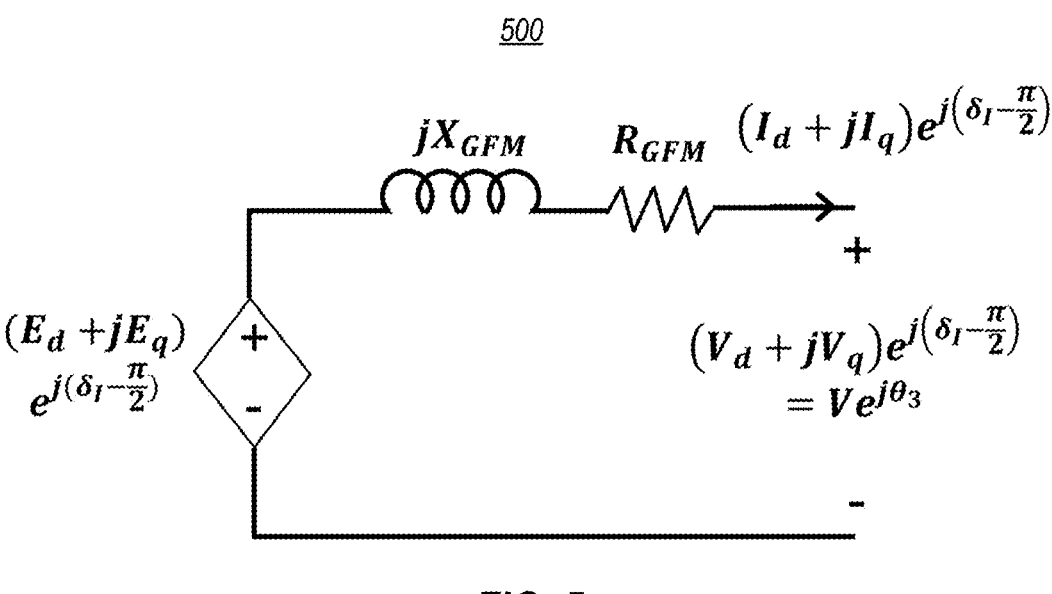
FIG. 5 illustrates a voltage behind impedance model adopted to represent the grid-forming inverter in the small signal stability analysis.

A voltage behind impedance model 500 is used, as shown in FIG. 5, wherein the standard LCL filter coupling inductance is the impedance. A GFM inverter regulates the voltage across the LCL capacitor, which is the voltage provided to the source in FIG. 5. A constant voltage is assumed, which absolves the voltage and current proportional-integral controllers and the filter capacitor and inductor dynamical states. As the interest here is primarily in the relatively slower frequency dynamics, the constant voltage is practical and similar reductions have been exercised in other analyses. The governing equations of the GFM inverter with Droop-e control, as installed at bus 3 in the network of FIG. 2, are (13) and (14):

$$d\delta_I = \omega_b\alpha\left[e^{\beta(p_{m,I,set})} - e^{\beta(p_{m,I})}\right] + \omega_{set} \tag{13}$$

$$\frac{dp_{m,I}}{dt} = \frac{-p_{m,I}}{T_{fil}} + \frac{V_3 \sin(\delta_i - \theta_3) I_{I,d} + V_3 \cos(\delta_i - \theta_3) I_{I,q}}{T_{fil}} \tag{14}$$

where $V_3$ is the RMS voltage at bus 3, $\vartheta_3$ is the angle of bus 220, $\delta_I$ is the internal angle of the GFM, and $I_{I,d}$ and $I_{I,q}$ are the internal d and q axis currents. The internal values are brought into the global reference frame with the $$e^{j(\delta_I - \frac{\pi}{2})}$$

expression. The internal voltages, $E_d$ and $E_q$, are taken as constants. This constant voltage assumption reduces the prototypical 13th order GFM model to a 2nd order model with the states of (15), because the current and voltage controllers, the filter inductor and capacitors, and the reactive power equations, are ignored. The relevant parameters are provided in Table II.

$$x_{GFM} = [\delta_I, p_{m,I}] \tag{15}$$

TABLE II

| System Parameters | |
| --- | --- |
| Parameter | Value |
| H(secs) | 3.01 |
| $X_q$ | 1.2578 |
| $T'_{qo}$(sec) | 0.6 |
| $K_E$ | 1.0 |
| $T_F$(sec) | 0.35 |
| $D_G$(%) | 5 |
| $X_{\alpha}$(pu) | 0.05 |
| $X_{GFM}$(pu) | 0.15 |
| $P_2$(pu) | 0.75 |
| $V_3$(pu) | 1.02 |
| $X_d$(pu) | 1.3125 |
| $X'_q$(pu) | 0.25 |
| $K_A$ | 20 |
| $T_E$(sec) | 0.314 |
| $S_E - \gamma$ | 0.0039 |
| $\omega_B$(rad/s) | 377 |
| $D_I - \alpha$ | 0.002 |
| $R_{GFM}$(pu) | 0.005 |
| $Q_2$(pu) | 0.25 |
| $S_G$(MVA) | 100 |
| $X'_d$(pu) | 0.1813 |
| $T'_{do}$(sec) | 5.89 |
| $T_A$(sec) | 0.2 |
| $K_F$ | 0.063 |
| $S_E - \epsilon$ | 1.555 |
| $X_{\alpha}$(pu) | 0.05 |
| $D_I - \beta$ | 3.0 |
| $T_{fil}$(sec) | 0.0167 |
| $V_1$(pu) | 1.02 |
| $S_I$(MVA) | 50 |

The eigenvalues of the 3-bus system of FIG. 2 were calculated for a range of power flows that span the per unit dispatch of the GFM inverter, from 0.01 to 0.99 to assess the stability of the full range of power dispatches for the Droop-e controller. Three complex eigenvalue pairs were identified via participation factor analysis as involving the GFM states of (15); $\lambda_{1,2}$, $\lambda_{3,4}$, and $\lambda_{5,6}$. The eigenvalue pair $\lambda_{1,2}$ involves the states $\delta_I$, $p_{m,I}$, $\delta_G$, and $\omega_G$. The level of participation varies as the dispatch, but all four states are present through the range of investigated dispatches.

The results of the small signal stability analysis here suggest that all modes of the 3-bus system with the Droop-e GFM control, including those not shown but only involving SG states, have a negative real part and positive damping due to $\alpha_i < 0$ for all $p_{set}$ values, and hence form a stable system.

The Droop-e control of the GFM is a strict departure from the static droop convention, which yields power sharing amongst frequency responsive devices. Namely, if all devices operating with frequency response maintain a global droop value (i.e., 5% in North America), then all devices will contribute to power differentials equally, as a function of the device rating. The Droop-e control does not hold this power sharing objective, as the primary goal is to provide more power by maintaining smaller deviations in frequency via the nonlinear nature.

Figure 6:
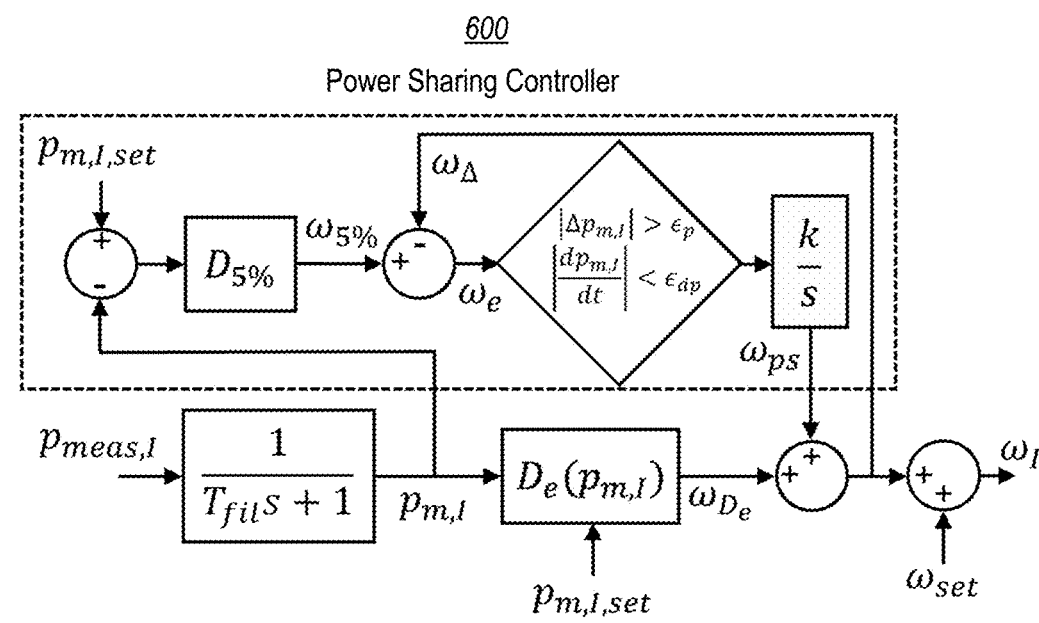
FIG. 6 illustrates a power sharing controller that adds an offset to the output frequency once the devices regain a steady operation after a disturbance, to achieve autonomous, 5% power sharing amongst other frequency responsive devices after the transient response of the Droop-e control.

In at least one embodiment, the power sharing controller 600, presented in FIG. 6, operates by modulating the output frequency with an offset component, $\omega_{ps}$. By not bypassing the fundamental Droop-e, the GFM inverter will continue to provide damping to the system with the exponential droop relation but will also change frequency such that the other frequency responsive devices react and equitable power sharing is accomplished. In at least one embodiment, the power sharing controller 600 is activated based upon detecting a change of a second magnitude in power delivered at the point of interconnection with the alternating current electric grid. The second magnitude may be different than a first magnitude of change that causes the droop-e control to activate. The controller operation is described:

First, the frequency deviation that would result with a static droop (i.e., 5%), $\omega_{5\%}$ in FIG. 6, is directly calculated with the resultant power deviation (16):

$$\omega_{5\%} = (p_{m,I,set} - p_{m,I})D_{5\%} \tag{16}$$

This frequency is compared with the Droop-e output, $\omega_{De}$, and the resultant power sharing component $\omega_{ps}$, to generate an error (17):

$$\omega_e = \omega_{5\%} - \omega_{\Delta} - \omega_{ps} \tag{17}$$

The logic block will remain open until a disturbance is registered (18):

$$\text{closed if } \begin{cases} |\Delta p_{m,I}| > \epsilon_p \\ \left|\dfrac{dp_{m,I}}{dt}\right| < \epsilon_{dp} \end{cases} \tag{18}$$

where are $\epsilon_p$ and $\epsilon_{dp}$ are tolerance parameters. As used herein, the tolerance parameters are used to define a so called "quasi-steady state." Once the disturbance criterion is met, this error is passed through an integrator block with gain k, which generates the frequency offset $\omega_{ps}$. As this offset is added to the output frequency $\omega_I$, $p_{m,I}$ will change due to the dynamics of alternating current (AC) power transfer and other frequency responsive devices on the network. This change is compensated for in the controller, and the GFM will arrive at the equitable, per unit power sharing value as $\omega_e$ is driven to 0 by the integrator. Note that the static droop gain is a parameter that can be arbitrarily set; e.g., 4% in Europe and 5% in North America.

Figure 7:
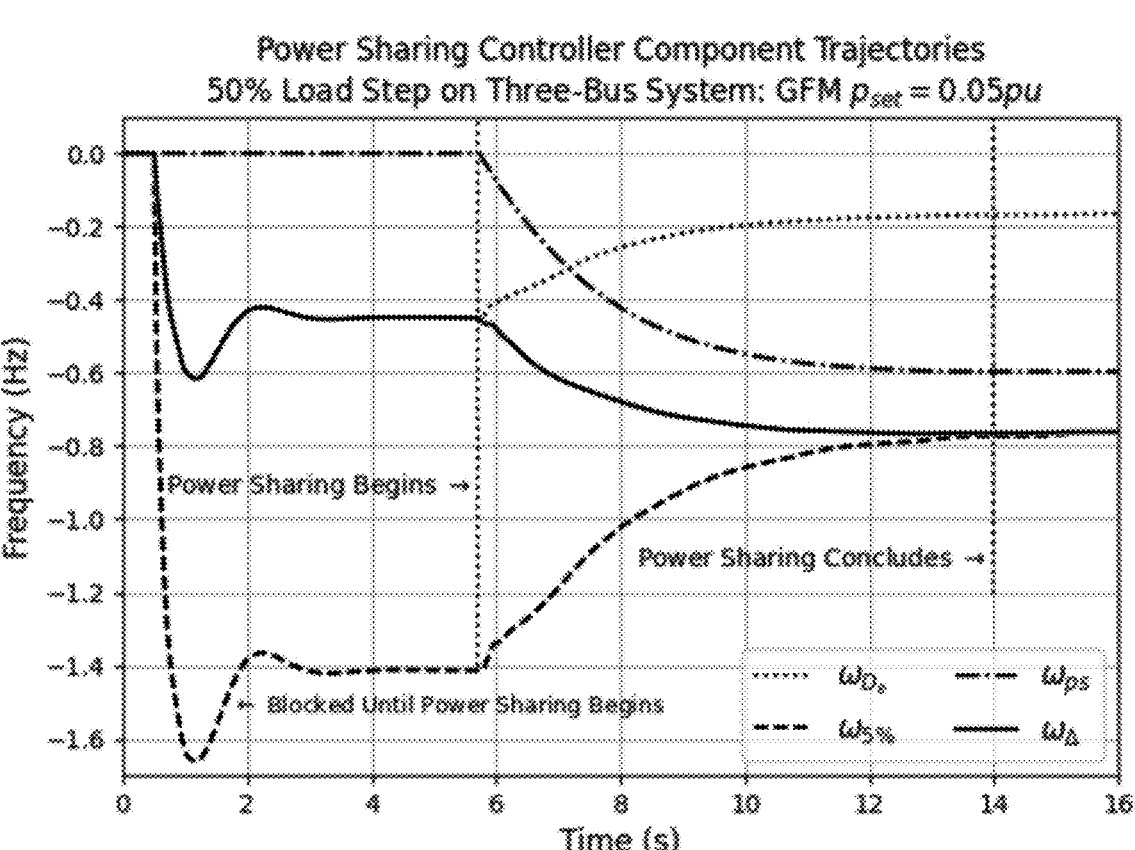
FIG. 7 illustrates a power sharing controller variable trajectories during the power sharing interval of a simulation on the 3-bus system.

To demonstrate the efficacy of the power sharing controller in FIG. 6, dynamic simulations were performed on the 3-bus system with a 37.5 MW load increase (a 50% increase, which is recognized as enormous, but used for illustrative purposes on this simple system) to show the capability of the Droop-e control as well as that of the proposed power sharing strategy. Two simulations were performed: (i) with Droop-e and (ii) with Static-5% droop. In the first simulation, one with Droop-e control, k=0.3. The results exhibit when the power deviation was registered ($|\Delta p_{m,I}| > \epsilon_p = 0.01$ pu), and the transients (also referred to herein as "oscillations") diminished $$\left(\left|\frac{dp_{m,I}}{dt}\right| < \epsilon_{dp} = 0.001\right),$$

the controller began applying the recovery offset, $\omega_{ps}$. FIG. 7 displays a chart 700 showing the response contribution from different components involved in this power sharing control strategy, involving $\omega_{De}$, $\omega_{5\%}$, $\omega_{\Delta}$, and $\omega_{ps}$. A factor of $(2\pi)^{-1}$ was applied to each trace for obtaining a Hertz value. Once the logic gate was closed, the exponential change in $\omega_{ps}$ began. As the frequency of the device changed with $\omega_{ps}$, the output power $p_{m,I}$ also changed, which incurred changes in $\omega_{De}$ and $\omega_{5\%}$. At the conclusion of this extended controller action, the frequency successfully reached the equitable settling value with $\omega_{\Delta}$ arriving at the $\omega_{5\%}$ value.

Figures 8A, 8B:
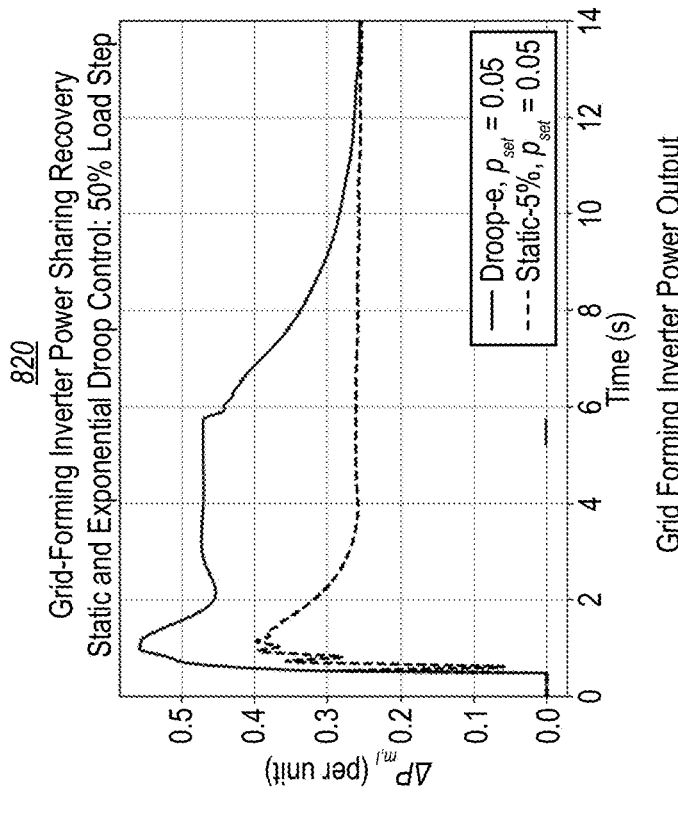
FIGS. 8A-8B illustrates a frequency and power sharing recovery control implementation in the time domain, following a 50% load step with a static 5% droop response provided for comparison.

In at least one embodiment, the proposed power sharing controller allows the GFM device to compensate for the power deficit and frequency variations in a more efficient way, while still settling at the same value that a conventional linear droop-based power sharing will yield (e.g., where a value of 5% is typical in North America). The results of these simulations are shown in FIG. 8*a* and FIG. 8*b*, with FIG. 8*a* presenting a chart 810 of the SG frequency response for these two simulations; the GFM frequency response with a static 5% droop was nearly identical to the SG and hence, not shown. These frequency results corroborate the superiority of the power sharing extended Droop-e control relative to the static droop control. They indicate the peak ROCOF for the Droop-e control was 2.3 Hz/s, compared to 3.9 Hz/s for the static 5% droop. The static 5% case experienced a much more deviant frequency nadir and entered potential UFLS territory; Droop-e certainly did not. Once the power sharing controller was initiated, at approximately t=6 s, the frequency response showed an exponential decrease (due to the integrator) as the GFM inverter tracked to achieve power sharing and made GFM headroom available to respond to another potential event. The nadir with the Droop-e control was the settling frequency.

FIG. 8*b* shows a chart 820 of the power output of the GFM inverter for each controller; Droop-e vs. static 5% droop. These results show that the Droop-e control delivered more power to the network than the static 5% droop control. When the power sharing controller was initiated, the power output exhibited a slow exponential decline to the 5% droop value; equitable power sharing was achieved autonomously within 15 seconds of the perturbation, while this rate was a parameterized gain that can be tuned for a faster or slower response by adjusting the value of k.

Figure 9:
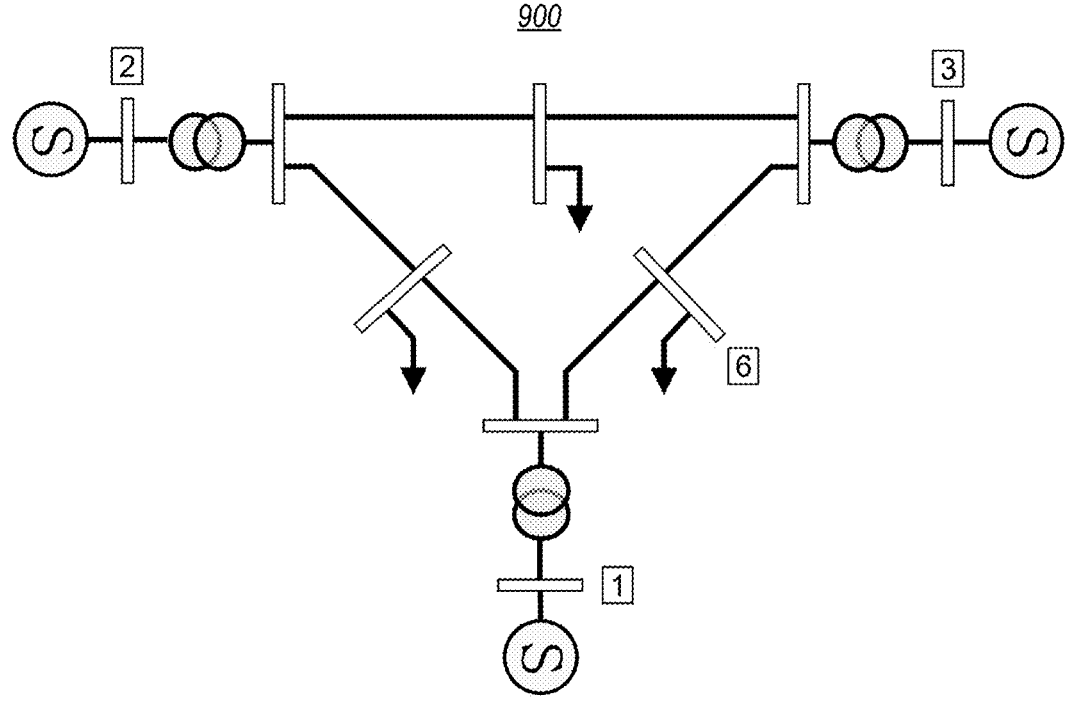
FIG. 9 illustrates a IEEE 9-bus system.

The IEEE 9-bus system was used to demonstrate and validate the capability of the Droop-e control on a mesh network, with multiple Droop-e GFM devices. The system configuration is given in Table VI, which corresponds with the network diagram 900 shown in FIG. 9. The perturbation applied was a 10% load step at bus 6. Three cases were simulated, the first is 9-A with all generators as SGs, modelled as in the previous dynamic simulations. The second case, 9-B, has generators 1 and 3 supplanted with static 5% droop GFMs. The third case, 9-C, has these two GFMs converted to Droop-e control. The power sharing control parameters were the same as from above.

TABLE VI

| 9 Bus Configuration | | | | | |
| --- | --- | --- | --- | --- | --- |
| | Rating | P | | Generator Type for Case | |
| Generator | (MVA) | (MW) | 9-A | 9-B | 9-C |
| 1 | 200 | 71.5 | SG | Static-5% | Droop-e |
| 2 | 200 | 163 | SG | SG | SG |
| 3 | 200 | 85 | SG | Static-5% | Droop-e |

In these simulations, a weighted frequency is calculated according to $$f(t) = \frac{\sum_{i=1}^{n}(MVA_i * f_i(t))}{\sum_{i}^{n} MVA_i}$$

here $f_i(t)$ is the frequency of device i at time t, $MVA_i$ is the device i rating, and n is the number of devices. This weighted frequency is used to determine the ROCOF and nadir values, according to the same definitions as presented above. The mechanical inertia rating of the system configuration, presented in Table VII, is a weighted average calculated as $$H = \frac{\sum_{i=1}^{n} H_i S_{B,i}}{\sum_{i}^{n} S_{B,i}}$$

where $H_i$ is the inertia rating (in s) of device i, $S_{B,i}$ is the MVA rating of device i, and n is the number of devices. The inertia rating of the GFM devices is 0 s.

Figure 10:
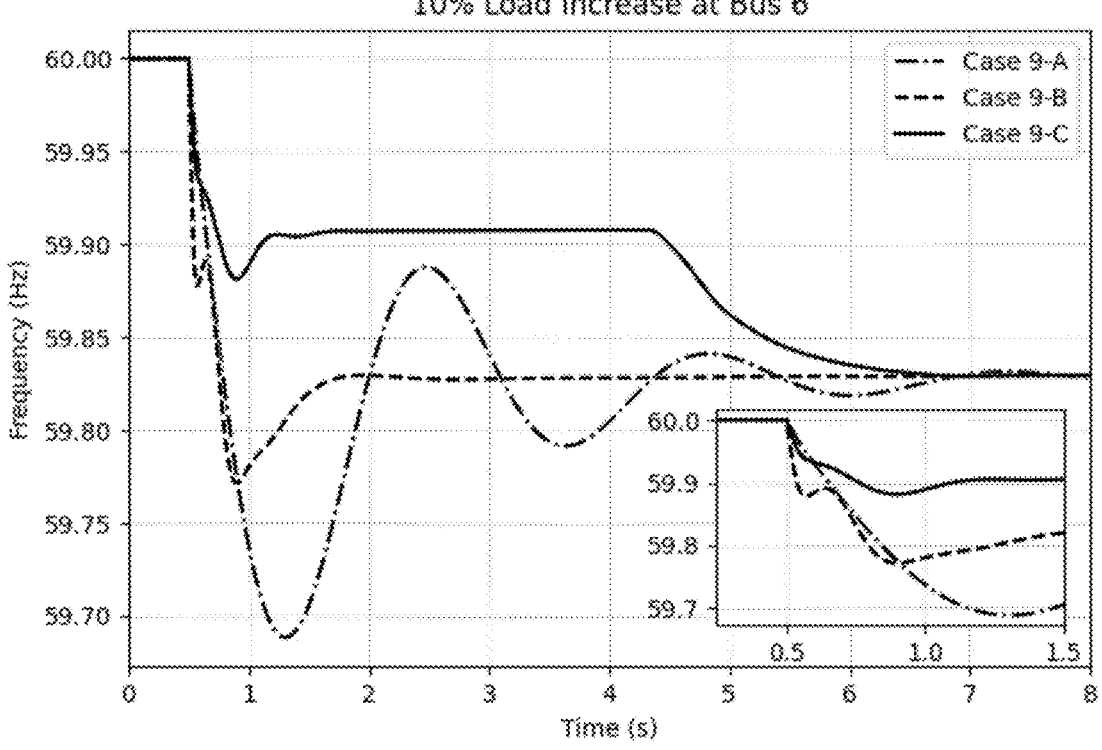
FIG. 10 illustrates an average frequency response of the 9-bus system for three simulated cases following a 10% load step at bus 6.

The time-domain average frequency response from the simulations of each case are presented in the chart 1000 of FIG. 10. The dot-dash, trace represents the Case 9-A response, with the quintessential second-order trajectory, the most deviant nadir (56.68 Hz) of the three cases, and an initial ROCOF of 0.69 Hz/s. Case 9-B, the dashed trace, shows an improvement in the nadir (59.77 Hz), but a much larger ROCOF of 1.22 Hz/s. Finally, Case 9-C, with the solid trace, shows the superior performance of the Droop-e control. In this case, Case 9-C, although the inertia is a third of Case 9A, the ROCOF values are identical at 0.66 Hz/s. The frequency trace for 9-C showed only a small initial overshoot, but this did not even register as the nadir because of the relatively large immediate delivery of power due to the Droop-e controller.

TABLE VII

| 9-Bus Case Results-Frequency Statistics Derived From Average | | | |
| --- | --- | --- | --- |
| Case | Nadir (Hz) | ROCOF (Hz/s) | Inertia (s) |
| 9-A | 56.68 | 0.69 | 3.0 |
| 9-B | 59.77 | 1.22 | 1.0 |
| 9-C | 59.83 | 0.68 | 1.0 |

It also showed approximately 4 seconds after the load step, the power sharing recovery control became engaged, with a gradual, exponential decrease in frequency towards to the settling frequency, 59.83 Hz, identical two the other two cases. The nadir for Case 9-C was the settling frequency. Table VII summarizes the frequency statistics for each case.

Figure 11:
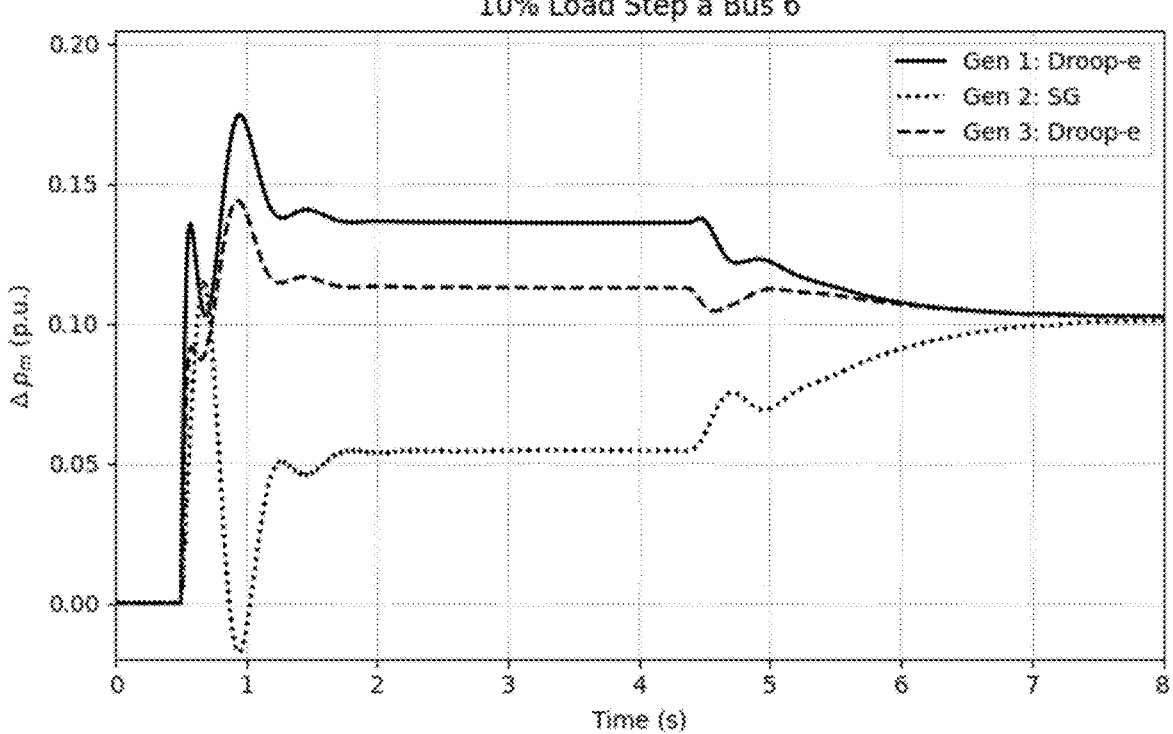
FIG. 11 illustrates an individual device power responses for the 9-bus system with two Droop-e generators at bus 1 and bus 3.

The power response of each device for Case 9-C is shown in the chart 1100 of FIG. 11. The two Droop-e controlled GFM inverters at bus 1 and 3 delivered significantly more power to the network than the SG at bus 2. Consequently, the transients were diminished within 1.5 seconds of the load step perturbation. Due to the differences in dispatch and the operation of the Droop-e control, the resultant power delivery from each GFM device was different. Approximately 4 seconds after the perturbation, the power sharing control was activated for each GFM, with Gen 3 engaging a tenth of a second prior to Gen 1. This control is autonomous and a factor of local variables; therefore, the time of initiation could vary amongst devices. The power output from all three devices then converged to an identical value, successfully achieving the 5% droop derived contribution based on the size of the load step.

Overall, the results here show superior transient frequency response by Droop-e, along with the efficacy of an autonomous and equitable power sharing with multiple devices operating under the same control.

Disclosed embodiments include a novel Droop-e control strategy for grid-forming inverters, which establishes an active power-frequency relationship based on an exponential function of the power dispatch. Disclosed embodiments are also able to control reactive power. The advantages of this control approach comprise an increased utilization of available headroom, mitigated frequency dynamics, and a natural limiting behavior. The proposed controller was demonstrated and validated using both the small-signal stability analysis and computational time-domain EMT simulations and compared to the hitherto standard static droop approach. Further, a novel secondary control was introduced that achieves power sharing autonomously with multiple devices following the primary Droop-e response to load perturbations, which was shown effective. Disclosed embodiments may further include controller designs to mitigate the high frequency mode present at high $p_{m,J,set}$ values. Additional embodiments may provide analytical and transient stability to larger networks with multiple Droop-e devices. Further embodiments may comprise secondary power sharing control with multiple devices Droop-e devices. Further still, embodiments may comprise the potential reduction in the quantity of frequency responsive devices required for standard contingencies.

Further, one having skill in the art would appreciate that disclosed methods can also be used for AC-to-AC conversions. An AC to AC conversion refers to the process of converting alternating current (AC) power from one voltage level or frequency to another voltage level or frequency while maintaining its AC waveform. This type of conversion is typically accomplished using power electronic devices and is commonly encountered in various applications within the power system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
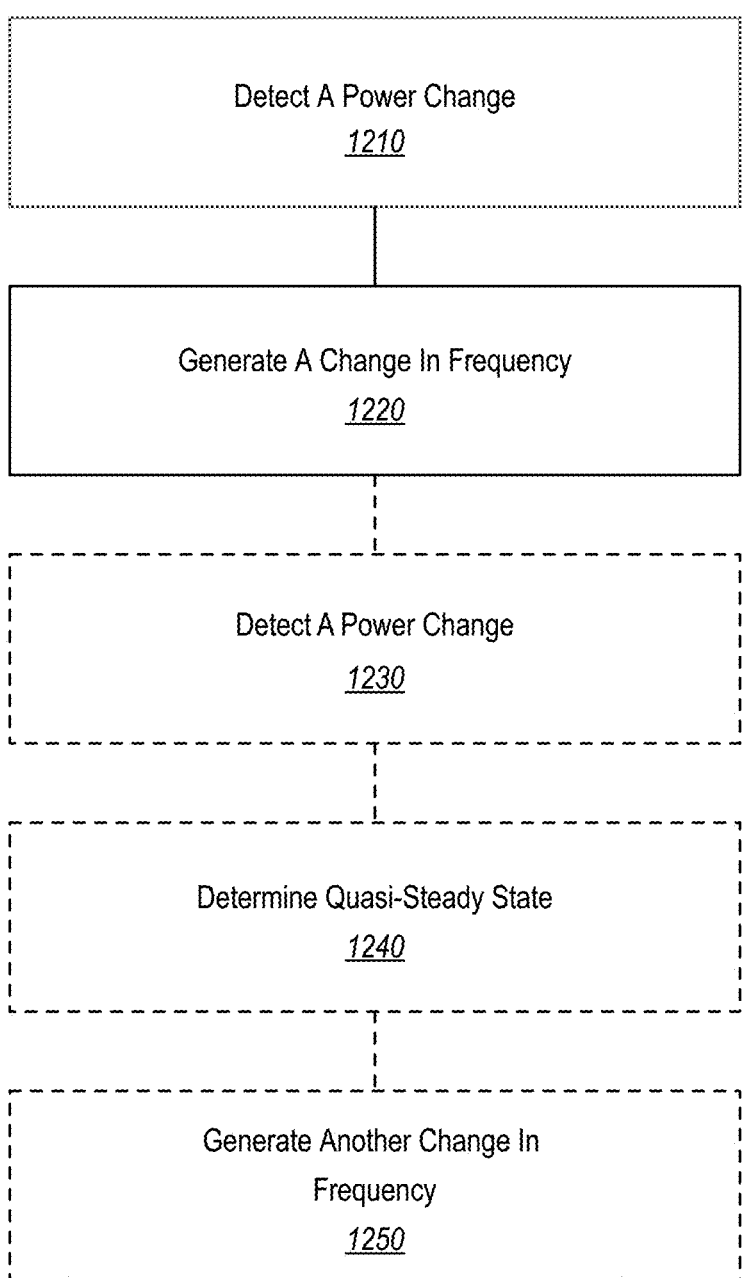
FIG. 12 illustrates a flowchart of a method for grid forming control.

FIG. 12 illustrates a flowchart of a method 1200 for grid forming control. Method 1200 includes an act 1210 of detecting a power change. Act 1210 comprises detecting a change of a first magnitude in power delivered at a point of interconnection with an alternating current electric grid. For example, an inverter may detect a threshold drop in power. In at least one embodiment, the drop in power is detected through a change in frequency.

Method 1200 also includes an act 1220 of generating a change in frequency. Act 1220 comprises generating a non-linear change in frequency at the point of interconnection with the alternating current electric grid. Generating the non-linear change in frequency causes a grid interfacing device to compensate in a non-linear manner for a power imbalance on the alternating current electric grid. For example, as explained above the non-linear equations of Droop-e provide for non-linear changes in frequency in response to changes in the grid loading.

Additionally, method 1200 includes an act 1230 of detecting a power change 1230. Act 1230 comprises detecting a change of a second magnitude in power delivered at the point of interconnection with the alternating current electric grid. For example, the power sharing controller 600 described above can activate at a second detected magnitude of power. The second magnitude can be the same or different from the first magnitude of power change.

Further, method 1200 includes an act 1240 of determining a quasi-steady state. Act 1240 comprises determining that oscillations in the power delivered at the point of interconnection have arrived at a quasi-steady state. For example, Equation 18 above describes the detection of oscillations (i.e., transients) reaching a quasi-steady state.

Further still, method 1200 includes an act 1250 of generating another change in frequency, Act 1250 comprises generating a non-linear change in frequency at the point of interconnection with the alternating current electric grid. Generating the non-linear change in frequency causes another grid interfacing device to change a magnitude of compensation for a power imbalance on the alternating current electric grid.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A grid-forming control method comprising:
detecting a change of a first magnitude in power delivered at a point of interconnection with an alternating current electric grid; and
generating a non-linear change in frequency at the point of interconnection with the alternating current electric grid,
wherein generating the non-linear change in frequency causes a grid-forming inverter to compensate in a non-linear manner for a power imbalance on the alternating current electric grid,
wherein generating the non-linear change in frequency causes the grid-forming inverter to compensate for a power imbalance on the alternating current electric grid more than a power imbalance on at least one synchronous generator connected to the alternating current electric grid.

2. The grid-forming control method as recited in claim 1, wherein the grid-forming control method is performed at an inverter.

3. The grid-forming control method as recited in claim 1, wherein the power comprises active power.

4. The grid-forming control method as recited in claim 1, wherein the power comprises reactive power.

5. The grid-forming control method as recited in claim 1, wherein the grid-forming inverter comprises an inverter.

6. The grid-forming control method as recited in claim 1, wherein generating the non-linear change in frequency causes an increase in power delivered at the point of interconnection within the alternating current electric grid.

7. The grid-forming control method as recited in claim 1, wherein the grid-forming inverter performs an AC-to-AC conversion.

8. A grid-forming control method, comprising:

detecting a change of a first magnitude in power delivered at a point of interconnection with an alternating current electric grid;

generating a non-linear change in frequency at the point of interconnection with the alternating current electric grid;

detecting a change of a second magnitude in power delivered at the point of interconnection with the alternating current electric grid;

determining that oscillations in the power delivered at the point of interconnection have arrived at a quasi-steady state; and generating a non-linear change in frequency at the point of interconnection with the alternating current electric grid, wherein generating the non-linear change in frequency causes a grid-forming inverter to compensate in a non-linear manner for a power imbalance on the alternating current electric grid, and wherein generating the non-linear change in frequency causes another grid-forming inverter to change a magnitude of compensation for a power imbalance on the alternating current electric grid.

9. The grid-forming control method as recited in claim 8, wherein the second magnitude is different than the first magnitude.

10. The grid-forming control method as recited in claim 8, wherein generating the non-linear change in frequency causes the grid-forming inverter to compensate for a power imbalance on the alternating current electric grid more than a power imbalance on at least one synchronous generator connected to the alternating current electric grid.

11. A computer system for grid-forming control comprising:

one or more processors; and one or more computer-readable media having stored thereon executable instructions that when executed by the one or more processors configure the computer system to perform:

detect a change of a first magnitude in power delivered at a point of interconnection with an alternating current electric grid; and generate a non-linear change in frequency at the point of interconnection with the alternating current electric grid, wherein generation of the non-linear change in frequency causes a grid-forming inverter to compensate in a non-linear manner for a power imbalance on the alternating current electric grid, wherein generation of the non-linear change in frequency causes the grid-forming inverter to compensate for a power imbalance on the alternating current electric grid more than a power imbalance on at least one synchronous generator connected to the alternating current electric grid.

12. The computer system as recited in claim 11, wherein at least one of the one or more processors are integrated into an inverter.

13. The computer system as recited in claim 11, wherein the power comprises active power.

14. The computer system as recited in claim 11, wherein the power comprises reactive power.

15. The computer system as recited in claim 11, wherein generating the non-linear change in frequency causes an increase in power delivered at the point of interconnection within the alternating current electric grid.

16. The computer system as recited in claim 11, wherein the grid-forming inverter comprises an inverter.

17. The computer system as recited in claim 11, wherein the grid-forming inverter performs an AC-to-AC conversion.

18. A computer system, comprising:

one or more processors; and one or more computer-readable media having stored thereon executable instructions that, when executed by the one or more processors, configure the computer system to perform:

detect a change of a first magnitude in power delivered at a point of interconnection with an alternating current electric grid;

generate a non-linear change in frequency at the point of interconnection with the alternating current electric grid;

detect a change of a second magnitude in power delivered at the point of interconnection with the alternating current electric grid;

determine that oscillations in the power delivered at the point of interconnection have arrived at a quasi-steady state; and generate a non-linear change in frequency at the point of interconnection with the alternating current electric grid, wherein generation of the non-linear change in frequency causes a grid-forming inverter to compensate in a non-linear manner for a power imbalance on the alternating current electric grid, and wherein generation of the non-linear change in frequency causes another grid-forming inverter to change a magnitude of compensation for a power imbalance on the alternating current electric grid.

19. The computer system as recited in claim 18, wherein the second magnitude is different than the first magnitude.

20. The computer system as recited in claim 18, wherein generation of the non-linear change in frequency causes the grid-forming inverter to compensate for a power imbalance on the alternating current electric grid more than a power imbalance on at least one synchronous generator connected to the alternating current electric grid.

* * * * *